(12) United States Patent
Morgan et al.

(10) Patent No.: US 12,182,625 B1
(45) Date of Patent: *Dec. 31, 2024

(54) HIGH PERFORMANCE COMPUTER WITH A CONTROL BOARD, MODULAR COMPUTE BOARDS AND RESOURCE BOARDS THAT CAN BE ALLOCATED TO THE MODULAR COMPUTE BOARDS

(71) Applicant: Management Services Group, Inc., Virginia Beach, VA (US)

(72) Inventors: Thomas Scott Morgan, Virginia Beach, VA (US); Steven Yates, Charlottesville, VA (US)

(73) Assignee: Management Services Group, Inc., Virginia Beach, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,525

(22) Filed: May 12, 2023

Related U.S. Application Data

(63) Continuation of application No. 17/749,506, filed on May 20, 2022, now Pat. No. 11,687,377, which is a continuation of application No. 17/387,682, filed on Jul. 28, 2021, now Pat. No. 11,366,701.

(60) Provisional application No. 63/057,464, filed on Jul. 28, 2020.

(51) Int. Cl.
*G06F 9/50* (2006.01)
*G06F 9/4401* (2018.01)
*G06F 9/44* (2018.01)

(52) U.S. Cl.
CPC .......... *G06F 9/5061* (2013.01); *G06F 9/4403* (2013.01)

(58) Field of Classification Search
CPC .............................. G06F 9/5061; G06F 9/4403
USPC .......................................................... 718/104
See application file for complete search history.

(56) References Cited

U.S. PATENT DOCUMENTS

| | | | |
|---|---|---|---|
| 11,366,701 B1 | 6/2022 | Morgan | |
| 11,687,377 B1 * | 6/2023 | Morgan | G06F 9/4403 718/104 |
| 2008/0168457 A1 * | 7/2008 | Accapadi | G06F 9/5077 718/104 |
| 2013/0185729 A1 * | 7/2013 | Vasic | G06F 9/5072 718/104 |
| 2013/0219386 A1 * | 8/2013 | Geibel | G06F 9/5061 718/1 |
| 2013/0311989 A1 * | 11/2013 | Ota | G06F 9/45558 718/1 |

(Continued)

*Primary Examiner* — Michael J Brown
(74) *Attorney, Agent, or Firm* — COOLEY LLP

(57) ABSTRACT

An apparatus can include a control board operatively coupled to a modular compute boards and to a resource boards by (1) a first connection associated with control information and not data, and (2) a second connection associated with data and not control information. The control board can determine a computation load and a physical resource requirement for a time period. The control board can send, to the modular compute board and via the first connection, a signal indicating an allocation of that modular compute board during the time period. The control board can send, from the control board to the resource board, a signal indicating an allocation of that resource board to the modular compute board such that that resource board allocates at least a portion of its resources during the time period based on at least one of the computation load or the physical resource requirement.

22 Claims, 2 Drawing Sheets

(56) References Cited

U.S. PATENT DOCUMENTS

2019/0354402 A1* 11/2019 Bivens .................. G06F 9/5077

* cited by examiner

HIGH PERFORMANCE COMPUTER WITH A CONTROL BOARD, MODULAR COMPUTE BOARDS AND RESOURCE BOARDS THAT CAN BE ALLOCATED TO THE MODULAR COMPUTE BOARDS

CROSS REFERENCE TO RELATED APPLICATION

This application is a continuation of U.S. patent application Ser. No. 17/749,506, filed May 20, 2022, entitled "High Performance Computer with a Control Board, Modular Compute Boards and Resource Boards that Can be Allocated to the Modular Compute Boards," now U.S. Pat. No. 11,687,377, which is a continuation of U.S. patent application Ser. No. 17/387,682, filed Jul. 28, 2021, entitled "High Performance Computer with a Control Board, Modular Compute Boards and Resource Boards that Can be Allocated to the Modular Compute Boards," now U.S. Pat. No. 11,366,701, which claims priority to and the benefit of U.S. Patent Application No. 63/057,464, filed Jul. 28, 2020 and entitled "High Performance Computer (HPC) Host Boards," the contents of each of which is incorporated herein by reference in its entirety.

TECHNICAL FIELD

The present disclosure relates to the field of computers and embedded computers, including, for example, a computer with a control board, modular compute boards and resource boards that can be allocated to the module compute boards.

BACKGROUND

Known computers each typically includes specific components, boards, cards, and/or fixed function subsystems such as, for example, a processor, a memory, a storage, a networking component(s), and other peripherals that are soldered on or connected to a main board. Therefore, the function(s) of known computers is generally fixed by the specific component, boards, card, and/or fixed function subsystems present in the computers and also by their exact interconnections. Accommodating new functions to these computer systems often involves costly and/or time-consuming reconfiguration and reconnection of the various components, boards, cards, and/or fixed function subsystems in the computer. Thus, a need exists for a computer that can allocate resources and/or functions on-demand and for increased performance, cost effectiveness, scalability, and flexibility.

SUMMARY

An apparatus can include a control board operatively coupled to each modular compute board from a group of modular compute boards and to each resource board from a group of resource boards by (1) a first connection associated with control information and not data, and (2) a second connection associated with data and not control information. The control board can determine a computation load and a physical resource requirement for a time period. The control board can send, to that modular compute board and via the first connection, a signal indicating an allocation of that modular compute board during the time period. The allocation is based on at least one of the computation load or the physical resource requirement. The control board can send, from the control board to that resource board, a signal indicating an allocation of that resource board to that modular compute board such that that resource board allocates at least a portion of its resources during the time period based on at least one of the computation load or a physical resource requirement. That modular compute board communicating with that resource board via the second connection for that modular compute board and the second connection for that resource board.

DETAILED DESCRIPTION

Figure 1:
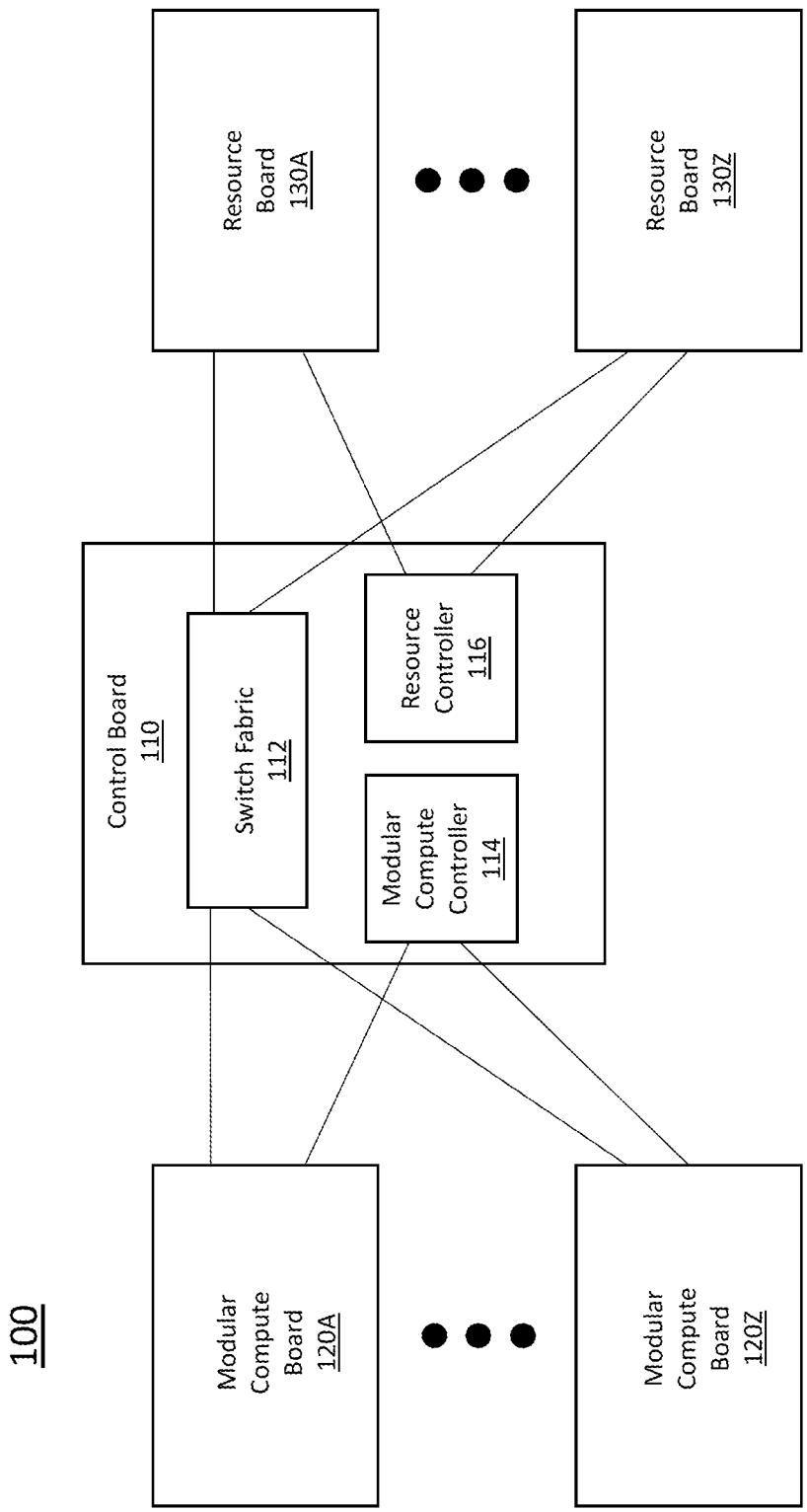
FIG. 1 is a schematic description of a high-performance computer, according to an embodiment.

Non-limiting examples of various aspects and variations of the embodiments are described herein and illustrated in the accompanying drawings.

One or more embodiments described herein generally relate to modular high-performance computers (HPCs), and in particular to methods, apparatus, and systems that can, for example, improve performance, scalability, density, flexibility, and manageability of computers while also reducing size, power consumption, weight, and/or heat generation of the HPCs.

One or more known computers may include separate purpose-built subsystems, and are inflexible or limited in their functionality, are not scalable, and/or cannot be tightly integrated. Implementing complex functions with such computers often involve using and interconnecting multiple purpose-built subsystems with known subsystem-to-subsystem connections to generate desired function from the overall computer. The purpose-built subsystems each replicates its own common infrastructure including circuits that perform, for example, alternating current (AC)-to-direct current (DC) power conversion, voltage regulation, system supervisory and control, clock generation, volatile memory, non-volatile storage, communication, networking interfaces, peripherals, and/or other common functions.

One or more known computers may be built with, for example, printed circuit boards that serve as peripheral cards and/or motherboards such as network cards, graphics cards, storage cards, and other fixed-function cards plugged into a fixed-design motherboard. The peripheral cards and/or motherboards can be used to replicate certain key infrastructure circuits. But replicating common physical resource elements and given the difficulty or inability of adding more of those common physical resource elements when desired or needed often result in, for example, added cost, added wasted space, added power consumption, added heat generation, added complexity, reduced performance, and/or reduced reliability.

Accommodating new functions or adding resources to the aforementioned known computers built with the aforementioned specific subsystems, boards, or cards typically involves reconfiguration and reconnection of the various fixed function subsystems, boards, or cards in the computer, replacement of entire subsystems, boards, and/or cards, and/or the interconnections between the subsystems, boards, and/or cards. Therefore, known computers typically generate, for example, a significant amount of electronic waste and suffer from an inherent and unavoidable loss of performance, energy efficiency, reusability, upgradeability, and/or functionality.

Described herein are modular high-performance computers (HPCs) that can be dynamically configured to include additional modular compute boards and scale physical resources when and/or where they are desired or needed to increase capabilities and meet the demands posed by new tasks for the modular HPCs. For example, in a dynamically configured computer, modular compute boards experiencing heavy demands for memory may have extra memory allocated to them by a system manager (also referred to as the "control board") from a shared memory pool that is available to all modular compute boards in the HPCs. In this manner, the modular compute boards can be dynamically upgraded with more memory to handle the new workload even though the module was not initially manufactured with enough memory on board. Additional physical resources can be requested to handle an increase in computational load and can be added dynamically during the modular HPC operation, when and where desired or needed. Once the tasks that generated a request for additional physical resources is over, the additional physical resources are de-allocated and returned to the shared pool, ready for future allocation to handle future tasks. One or more such HPCs described herein significantly increase, for example, the performance, cost effectiveness, scalability, and flexibility of the HPCs and their ability to accommodate new tasks.

One or more embodiments described herein provide methods and apparatus for organizing a high-performance computer (HPC) into one or more modular compute boards, one or more resource boards, and at least one control board. The one or more modular compute boards can have different functions (e.g., processor, volatile memory, non-volatile memory, networking, management, power supply, graphics processing unit, artificial intelligence processor, wireless interface, satellite communication interface, and/or the like), and can be operatively coupled to a control board. The one or more resource boards can have resources (e.g., computing resource, power resources, memory resources) shared amongst the one or more modular compute boards and under control of the at least one control board.

FIG. 1 is a schematic description of a high-performance computer 100, according to an embodiment. The high-performance computer 100 includes a control board 110, a set of modular compute boards 120A-Z, and a set of resource boards 130A-Z. The control board 110 is operatively coupled to each modular compute board from the set of modular compute boards 120A-Z and each resource board from the set of resource boards 130A-Z by a first set of connections and a second set of connections.

The first set of connections can be associated with control information and not data, and the second set of connections can be associated with data and not control information. For example, in some instances, the first set of connections can be connected, on one side of a wire, to a port on the control board 110 that is configured to send/receive control signals indicating control information and not data, and on the other side of the wire, to a port on a modular compute board 120A or on a resource board 130A that is configured to send/receive control signals indicating control information and not data. For example, in some instances, the second set of connections can be connected, on one side of the wire, to a port on the control board 110 that is configured to send/receive data signals indicating data and not control information, and on the other side of the wire, to a port on a modular compute board 120A or on a resource board 130A that is configured to send/receive data signals indicating data and not control information.

The control board 110 can be configured to receive, from one or more modular compute boards 120A-Z and via the first set of connections, signals indicating a computation load and a physical resource requirement (or physical resource desired/requested) for the one or more modular compute boards 120A-Z. In some instances, signals indicating the computation load and the physical resource requirement for a modular compute board from the one or more modular compute boards 120A-Z can include, for example, an indication of an identification for that modular compute board (e.g., an identification number, a hash, etc.), at least one timestamp (e.g., indicating a time period for the computation load and the physical resource requirement), at least one indication of a type of resource requirement, an amount of resource requirement, and/or the like.

The control board 110 can be configured to send, from the control board 110 to one or more resource boards 130A-Z, signals indicating allocation of one or more resource boards 130A-Z to the one or more modular compute boards 120A-Z. In response to allocation of the one or more resource boards 130A-Z, the one or more resource boards 130A-Z allocates at least a portion of their resources based on the signals from the control board 110 (or received via the control board 110 from the one or more modular compute boards 120A-Z). Each signal from the control board 110 can include, for example, an indication of identification for a modular compute board 120A (e.g., an identification number, a hash, etc.), a timestamp (e.g., indicating a time period for computation load and physical resource requirement), an indication of type of resource requirement, an indication of an amount of resource requirement, and/or the like.

The control board 110 includes at least a switch fabric 112, a modular compute controller 114, and a resource controller 116. In some implementations, the switch fabric 112, the modular compute controller 114, and the resource controller 116 are mounted on (e.g., soldered, bounded, and/or the like) an integrated circuit and/or a common printed circuit board (PCB) that includes electronic circuitry (not shown) to interconnect and/or control the switch fabric 112, the modular compute controller 114, and the resource controller 116.

The switch fabric 112 can be or include, for example, an internal peripheral component interconnect (PCI)-express switch fabric, which can be operatively coupled to each modular compute board from the set of modular compute boards 120A-Z by a second connection from the second set of connections (associated with data) and for that modular compute board. Similarly, the switch fabric 112 can be operatively coupled to each resource board from the set of resource boards 130A-130Z by a second connection from the second set of connections (associated with data) and for that resource board.

The control board 110 can be configured to facilitate, in addition to the switch fabric 112, the modular compute controller 114, and the resource controller 116, a set of connectors (also 'ports') such as for example, a universal serial bus (USB) connector(s), a USB 2.0 connector(s), a USB 3.0 connector(s), a mini USB connector(s), a micro USB connector(s), a USB-c connector(s), a high definition multimedia interface (HDMI) connector(s), a video graphics array connector(s), a general purpose input/output (GPIO) connector(s), a general purpose interface bus (GPIB or IEEE-488) connector(s), and/or the like, for connecting the switch fabric 112, the modular compute controller 114, and the resource controller 116 of the control board 110 with the set of modular compute board 120A-Z and/or with the set of resource boards 130A-Z. The set of connectors can include a power or signal medium that connects to a set of connector interfaces. The set of connector interfaces can be integrated to the control board 110, the set of modular compute board 120A-Z, and/or the set of resource boards 130A-Z. In one example, a peripheral connector (e.g., a copper wire having two ends and with one male USB connector at each end) can connect to a corresponding type A USB 3.0 receptacle (female connector) located at the control board 110 and a type A USB 3.0 receptacle at a peripheral such as a projector video system.

Each modular compute board from the set of modular compute boards 120A-Z can be or include, for example, a hardware-based integrated circuit (IC) board, a printed circuit board (PCB), or any other suitable electronic board configured to perform the control function of provisioning that modular compute board and not any other control functions. For example, a modular compute board 120A can be configured to perform only an artificial-intelligence (AI) training process for a text-to-voice engine and not configured to generate an audio signal. In some implementations, each modular compute board from the set of modular compute boards 120A-Z can have a single compute function (e.g., a specialized function such as, for example, networking, storage, and/or the like). In some implementations, one or more modular compute boards from the set of modular compute boards 120A-Z can have multiple functions such as, for example, both networking and streaming, both storage and authenticating, and/or the like. Having flexibility of having one or more functions on the set of modular compute boards 120A-Z, in some instances, can enable flexibility and cost effectiveness in circuit design and in system design. Each modular compute board from the set of modular compute boards 120A-Z can be configured to establish a connection to the control board 110 via a first connector from the first set of connectors and a second connector from the second set of connectors. Specifically, that modular compute board 120A-Z can be connected via the first connector to the modular compute controller 114 of the control board 110 to send and/or receive control information, and can be separately connected via the second connector to the switch fabric 112 of the control board 110 to send and/or receive data.

One or more modular compute boards from the set of modular compute boards 120A-Z can be processor boards configured to be removably coupled to the control board 110. Each processor board can be or include, for example, a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), and/or the like.

One or more modular compute boards from the set of modular compute boards 120A-Z can be memory boards configured to be removably coupled to the control board 110. Each memory board can be or include, for example, a memory buffer, a random access memory (RAM), a read-only memory (ROM), a hard drive, a flash drive, a secure digital (SD) memory card, a compact disk (CD), an external hard drive, an erasable programmable read-only memory (EPROM), an embedded multi-time programmable (MTP) memory, an embedded multi-media card (eMMC), a universal flash storage (UFS) device, and/or the like.

One or more modular compute boards from the set of modular compute boards 120A-Z can be communication interface boards configured to be removably coupled to the control board 110, and configured to connect the control board 110 and optionally one or more modular compute boards from the set of modular compute boards 120A-Z to a network. Each communication interface board can be or include, for example, a network interface card (NIC), a Wi-Fi™ board, a Bluetooth® board, an optical communication board, and/or any other suitable wired and/or wireless communication interface. In some instances, each communication interface board can facilitate receiving or transmitting data via the network. More specifically, in some implementations, each communication interface board can facilitate receiving or transmitting data through the network from or to a modular compute board.

The network (not shown) can be a digital telecommunication network of servers and/or compute devices. The servers and/or computes device on the network can be connected via one or more wired or wireless communication networks (not shown) to share resources such as, for example, data storage or computing power. The wired or wireless communication networks between servers and/or compute devices of the network can include one or more communication channels, for example, a radio frequency (RF) communication channel(s), an extremely low frequency (ELF) communication channel(s), an ultra-low frequency (ULF) communication channel(s), a low frequency (LF) communication channel(s), a medium frequency (MF) communication channel(s), an ultra-high frequency (UHF) communication channel(s), an extremely high frequency (EHF) communication channel(s), a fiber optic commination channel(s), an electronic communication channel(s), a satellite communication channel(s), and/or the like. The network can be or include, for example, the Internet, an intranet, a local area network (LAN), a wide area network (WAN), a metropolitan area network (MAN), a worldwide interoperability for microwave access network (WiMAX®), a virtual network, any other suitable communication system and/or a combination of such networks.

One or more modular compute boards from the set of modular compute boards 120A-Z can be graphical interface boards configured to be operatively coupled to the control board 110, and configured to provide signals to and from the control board. Each graphical interface board can be connected to the control board 110 via, for example, an industry standard architecture (ISA), peripheral component interconnect (PCI), peripheral component interconnect extended (PCI-X), accelerated graphics port (AGP), and/or the like. Each graphical interface board can be connected to a peripheral device (e.g., a monitor, a projector, a television, etc.) via, for example, a video graphics array (VGA) connector, high-definition multimedia interface (HDMI) and/or the like. In some implementations, a graphical interface board can receive and/or transmit video signals from or to the control board 110 connected to a peripheral device configured to receive and/or transmit video signals from or to the control board 110. In some implementations, a graphical interface board can include an integrated peripheral unit (e.g., a display, a camera, etc.) to receive and/or transmit video signals from or to a user, and further configured to receive and/or transmit the video signals to the control board 110.

One or more modular compute boards from the set of modular compute boards 120A-Z can be encryption boards configured to be removably coupled to the control board 110, and configured to provide signals to and from the control board 110. In some implementation, an encryption board can be or include a hardware-based encryption board operatively connected to the control board 110. In one example, the hardware-based encryption board can operate individually to encrypt a message received, via the control board 110, from another modular compute board from the set of modular compute boards. In another example, the hardware-based encryption board can operate together with a set of software codes being executed at the control board 110.

One or more modular compute boards from the set of modular compute boards 120A-Z can be or include sensor fusion boards configured to be removably coupled to the control board 110, and configured to provide signals to and from the control board 110. In one example the sensor fusion board is light detection and ranging (LiDAR) board including a set of light emitters and a set of light sensors collectively configured to detect objects in the three-dimensional space surrounding the LiDAR board. The sensor fusion board can be configured to send sensor data, via the control board 110, to another modular compute board from the set of modular compute boards 120A-Z and further receive a set of instruction from the control board 110 and/or another modular compute board from the set of modular compute boards 120A-Z.

One or more modular compute boards from the set of modular compute boards 120A-Z can be sound interface boards configured to be removably coupled to the control board 110, and configured to provide audio signals to and from the control board 110. Each sound interface board can be, for example, a consumer-grade sound interface board, an environmental audio expansion, a sound interface board with analog-to-digital (AD) and digital-to-analog (DA) converters, a high-definition sound interface, and/or the like. In some instances, each sound interface board can facilitate receiving or transmitting audio signals via a peripheral device (e.g., a microphone, a speaker, etc.). More specifically, in some implementations, a sound interface board can receive and/or transmit audio signals from or to control board 110 operatively coupled or connected to the peripheral device configured to receive and/or transmit audio signals from or to the control board 110. In some implementations, a sound interface board can include an integrated peripheral unit (e.g., a microphone, a speaker, etc.) to receive and/or transmit audio signals from or to a user, and further configured to receive and/or transmit the audio signals to the control board 110.

The set of resource boards 120A-Z can be or include, for example, a hardware-based integrated circuit (IC) board, a printed circuit board (PCB), or any other suitable electronic board, each configured to provide at least one computing resource (e.g., processing unit, memory, and/or the like). The set of resource boards 120A-Z can have computing resources that can be dynamically allocated or deallocated (e.g., allocated or deallocated to a modular compute board). Each resource board from the set of resource boards 120A-Z can be configured to perform provisioning of that resource board and not any other control functions. For example, in some instances, a resource board can include a graphics processing unit (GPU) specialized for cryptocurrency mining. Therefore, when a modular compute board 120A-Z sends a request to the control board 110 for a cryptocurrency mining function, the resource board 130A-Z with the GPU specialized for cryptocurrency mining can be selectively allocated to that modular compute board 120A-Z. Each resource board from the set of resource boards 130A-Z can be configured to establish a connection to the control board 110 via a first connector from the first set of connectors and a second connector from the second set of connectors. Specifically, a resource board can be connected via the first connector to the resource controller 116 of the control board 110 to send and/or receive control information, and can be connected via the second connector to the switch fabric 112 of the control board 110 to send and/or receive data.

In use, the modular compute controller 114 of the control board 110 can determine an appropriate (or requested or desired) computation load (e.g., a request for processor cores, a request for volatile memory, and/or the like) and the physical resource requirements (e.g., a request for electrical power, a request for communication bandwidth, and/or the like) for a given task or processing job. Upon this determination, the modular compute controller 114 of the control board 110 can send, to a modular compute board(s) 120A (-Z) and via the first connection, a signal indicating an allocation of that modular compute board(s) 120A(-Z) during a time period. The signal can be sent over a first connection from the first set of connections that are associated with control information and not data. In one example, the signal can include a timestamp indicating the time a computational load is desirable (or requested or scheduled). In another example, the signal can be sent during a time asking for an immediate computational load to be provided in substantially real-time (e.g., 100 milliseconds, 1 second, 10 seconds, 1 minutes, and/or the like).

In an alternative use, after the modular compute controller 114 of the control board 110 has determined the appropriate (or desired or requested) computation load and physical resource requirements for a given task or processing job and after the modular compute controller 114 sent a signal(s) to allocate a given modular compute board(s) 120A(-Z), it is possible for example that a modular compute board(s) 120A(-Z) encounters an unexpected need for additional computation load and/or physical resource(s). In such a situation, that modular compute board(s) 120A(-Z) can generate a request for such additional computation load and/or physical resource(s) and send that request (a signal indicating a request) to the modular compute controller 114 of the control board 110. (Similarly, that modular compute board(s) 120A(-Z) can generate a request for such fewer computation load and/or physical resource(s).) The modular compute controller 114 of the control board 110 can receive, from the modular compute board(s) 120A(-Z) and via the first connection, the signal indicating the request for a modified computation load (e.g., a request for a different number of processor cores, a request for a different number of volatile memories, and/or the like) and a modified physical resource requirement (e.g., a request for a different amount of electrical power, a request for a different amount of communication bandwidth, and/or the like) for that modular compute board 120A during a time period. The request can be sent over a first connection from the first set of connections that are associated with control information and not data. In one example, the request can include a timestamp indicating the time a modified computational load is desirable (or requested or scheduled). In another example, the request can be sent during a time asking for an immediate modified computational load to be provided in substantially real-time (e.g., 100 milliseconds, 1 second, 10 seconds, 1 minutes, and/or the like).

In some instances (e.g., in the first-mentioned use or the alternative use), the modular compute controller 114 of the control board 110 can include a first record (e.g., stored in an internal memory (not shown) of the modular compute controller 114) for the set of modular compute boards 120A-Z. The first record can be updated, for example, on regular intervals (or predefined intervals) and/or every time the modular compute controller 114 receives the request for the computation load and/or the physical resource requirement.

The resource controller 116 of the control board 110 can configured to send, to a resource board from the set of resource boards 130A-Z, a signal indicating an allocation of that resource board to the modular compute board 120A-Z such that that resource board 130A-Z allocates at least a portion of its computation resources (e.g., a subset of processor cores from a set of processor cores available on that resource board) and/or physical resource (e.g., an electrical power that is lower than a maximum output power of that resource board). The allocation of computation resources and/or physical resources can be during the time period based the signal from the modular compute board 120A-Z. For example, in some instances, the resource controller 116 can include a second record (e.g., stored in an internal memory (not shown) of the resource controller 116) for the set of resource boards 130A-Z. The second record can be updated, for example, on regular intervals (or predefined intervals) and/or every time the resource controller 114 allocates a resource board 130A-Z.

In some implementations, the control board 110 can include a controller (not shown) that can access the first record for the modular compute controller 114 and/or the second record for the resource controller 116 and (a) select a resource board 130A-Z for allocation to a modular compute board 120A-Z upon a request from the modular compute board 120A-Z and/or (b) prioritize allocation of a resource board 130A-Z from multiple requests received from the set of modular commute boards 120A-Z. In some implementations, the controller (not shown) of the control board 110 can include an internal memory (not shown) that stores the first record and the second record. Once a resource board 130A is allocated to a modular compute board 120A, the resource board 130A be configured to send and/or receive data via a second connection associated from the second set of connection to the switch fabric 112 of the control board 110 that can route the data to the modular compute board 120A to which the resource board 130A is allocated.

In one example, a modular compute board 120A-Z can be configured to perform an AI training and/or executing process using a graphical processing unit and for a text-to-voice engine. The modular compute board 120A-Z can be configured not to perform any other function such as for example, generating an audio signal or performing an optical character recognition (OCR). Upon a first request received (e.g., via the first connection and at a first time period) from the modular compute board 120A-Z to provide additional training data from a set of paper documents, the control board 110 can select and allocate a scanner with an OCR capability to scan the set of paper documents and send the data (e.g., via the first connection and switch fabric 112) for the scanned documents to the modular compute board 120A-Z for training an AI model. Once the AI training model is trained, the modular compute board 120A-Z can dynamically send a second request (via the first connection and a second time period) for an additional resource board 130A-Z to generate an audio signal and send the audio signal to a speaker.

In some implementations, all or some of the set of modular compute boards 120A-Z and the set of resource boards 130A-Z can be removably coupled to (e.g., via a port on) the control board 110. When a modular compute board 120A or a resource board 130A is removably coupled to the control board 110, the control board 110 can authenticate the modular compute board 120A or the resource board 130A in response to the modular compute board 120A or the resource board 130A being coupled to the control board 110. An authentication of the modular compute board 120A or the resource board 130A can include exchanging a set of tokens and/or power between the modular compute board 120A or the resource board 130A and the control board 110. The set of tokens can be for example a set of passwords, a set of codes, a set of electric signals, a set of electromagnetic signals, and/or the like.

In some implementations, the modular compute board 120A or the resource board 130A can be configured not have power supply of their own. The control board 110 can be configured to send a first power to the modular compute board 120A or the resource board 130A in response to being operatively coupled to the control board 110 and before authenticating the modular compute board 120A or the resource board 130A. The first power can be a small amount of power sufficient to operate an authentication circuit on the modular compute board 120A or the resource board 130A (e.g., an integrated circuit (IC) chip that performs the authentication). After authenticating the modular compute board 120A or the resource board 130A, the control board 110 can then send a second power to the modular compute board 120A or the resource board 130A. The second power can be different than the first power and sufficient to operate the remaining portions of the modular compute board 120A or the resource board 130A. The control board 110 can then send control signals (via the first connection) to the modular compute board 120A or the resource board 130A after authenticating the modular compute board 120A or the resource board 130A. The control board 110 can be configured not send the control signals to the modular compute board 120A or the resource board 130A before authenticating the modular compute board 120A or the resource board 130A.

Although the control board 110 is shown and described with respect to FIG. 1 as a singular device, in some embodiments, the high-performance computer 100 can include multiple control boards, each including a switch fabric, a modular compute controller and a resource controller. The multiple control boards can be operatively coupled to each other. For example, in some instances, the multiple control boards can be mounted on a single main board (also known as "motherboard") that include circuitry to control operation of the multiple control boards.

The control board 110, the set of modular compute boards 120A-Z and the set of resource boards 130A-Z collectively form high-performance computer 100 (which may include other boards, components and/or devices not shown). That is, the control board 110, the set of modular compute boards 120A-Z, and the set of resource boards 130A-Z, each alone does not form (cannot operate as) the computer. In some implementations, the computer may be the modular embedded compute appliance docking board as described in U.S. Pat. No. 10,712,778, entitled "Modular Embedded Compute Appliance Docking Board, And Methods And Systems For The Same", which is incorporated herein in its entirety by this reference. In some implementations, the computer may include a housing as described in U.S. Pat. No. 10,775,856, entitled "Compute Device Housing With Layers Of Electromagnetic Interference Shields, And Device And Systems For The Same", which is incorporated herein in its entirety by this reference. In some implementations, the computer may include a layered power filters as described in U.S. Pat.

No. 10,869,394, entitled "Apparatus And Methods For Reducing Unintended Transport Of Data From Power Distribution Systems Using layered Power Filters", which is incorporated herein in its entirety by this reference.

In some implementations, the computer may include an embedded chassis with firmware as described in U.S. patent application Ser. No. 16/921,554, entitled "Modular Embedded Chassis With Firmware For Removably Coupled Compute Devices, And Methods And The Systems For The Same", which is incorporated herein in its entirety by this reference. In some implementations, the computer may include a secure compute device housing with sensors as described in U.S. patent application Ser. No. 16/935,994, entitled "Secure Compute Device Housing With Sensors, And Methods And Systems For The Same", which is incorporated herein in its entirety by this reference. In some implementations, the computer may include a layered printed circuit board as described in U.S. patent application Ser. No. 17/169,703, entitled "Isolation of Compartments in a Layered printed Circuit Board and Apparatus and Methods for the Same", which is incorporated herein in its entirety by this reference.

Figure 2:
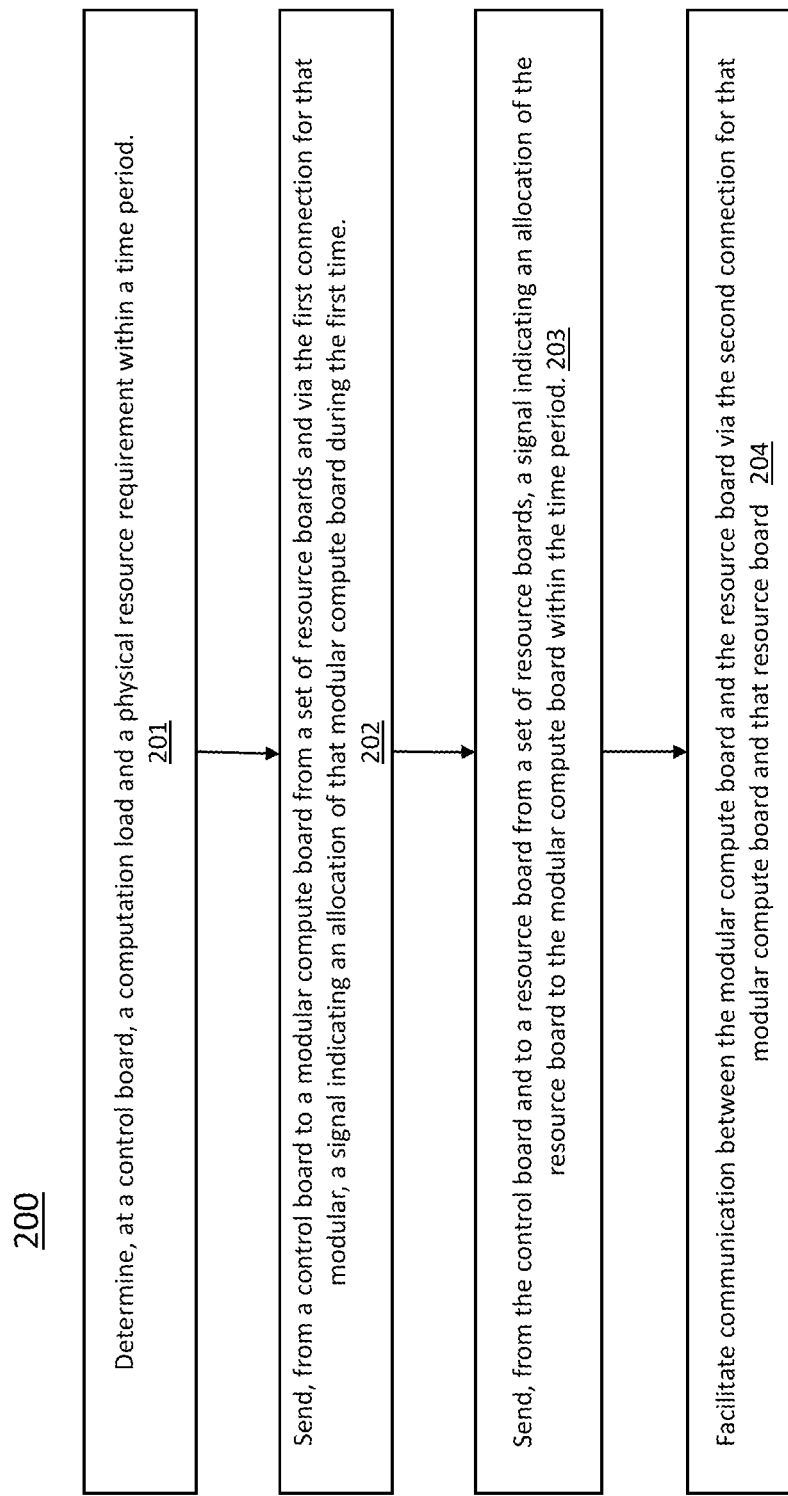
FIG. 2 is a flowchart illustrating a method of operating a high-performance computer, according to an embodiment.

FIG. 2 is a flowchart illustrating a method of operating a high-performance computer (e.g., high-performance computer 100 described above with respect to FIG. 1), according to an embodiment. At 201, a determination of a computation load and a physical resource requirement for a time period is made, at a control board. The computation load and the physical resource requirement can be, for example, based on or for a given task(s) or processing job(s). The control board can receive information about the given task(s) or processing job(s), for example, from a user via a user device (not shown) with a user interface. This information can then be used to determine the computation load and a physical resource requirement At 202, a signal, indicating an allocation of a modular compute board from a set of modular compute boards, is sent within the time period and from the control board to the modular compute board. The allocation can be based on at least one of the computation load or a physical resource requirement. Each modular compute board from the set of modular compute boards is operatively coupled to the control board by (1) a first connection associated with control information (e.g., a request indicating a computation load, physical resource requirement, a timestamp, and/or the like) and not data, and (2) a second connection associated with data (e.g., data to be processed at a resource board, data to be stored at a resource board, data to be used to generate an audio signal, data to be used to generate a video stream, and/or the like) and not control information. The control board can send the signal to the modular compute board via the first connection for that modular compute board. Each modular compute board from the set of modular compute boards is configured to perform provisioning of that modular compute board and not any other control functions.

At 203, a signal, indicating an allocation of a resource board from a set of resource boards to the modular compute board, is sent within the time period and from the control board to the resource board, based on at least one of the computation load or a physical resource requirement. Each resource board from the set of resource boards is operatively coupled to the control board by (1) a first connection associated with control information and not data, and (2) a second connection associated with data and not control information. The control board sends the signal to the resource board via the second connection for the resource board. Each resource board from the set of resource boards is configured to perform provisioning of that resource board and not any other control functions.

At 204, communication between the modular compute board and the resource board is facilitated via the second connection for that modular compute board and that resource board. In some instances, the communication between the modular compute board and the resource board can be facilitated by a switch fabric (similar to the switch fabric 112 as shown and described with respect to FIG. 1) of the control board. The control board can include, for example, an internal PCI-express switch fabric that is operatively coupled to each modular compute board from the set of modular compute boards and by the second connection (for transferring data and not control information) for that modular compute board, and to each resource board from the set of resource boards by the second connection for that resource board. The switch fabric of the control board can facilitate communications between the module compute board and the resource board, for example, by establishing, controlling and/or terminating the connection(s) through the switch fabric to allow communications between the module compute board and the resource board.

In some instances, the control board can send at a first time period, to the modular compute board from the set of modular compute boards and via the first connection for that modular compute board, a first signal indicating a first allocation for that modular compute board based on a first computation load and/or a first physical resource requirement. After a resource board is allocated to the modular compute board in response to the first request, the control board can send at a second time period after the first time period, to the modular compute board and via the first connection, a second signal indicating a second allocation for that modular compute board based on a second computation load and/or a second physical resource requirement. In response to the second allocation for that modular compute board, the first resource board associated with the modular compute board can be deallocated such that the resource board deallocates the portion of its resources associated with the modular compute board based the second signal during the second time period. After deallocation of the resource board, the control board can be configured not to send/receive data between the modular compute board and the resource board during the second time period via the second connection.

In some implementations, a set of control boards can be used in the high-performance computer, instead of the (singular) control board. For example, the high-performance computer can include a first control board and a second control board. The first control board can be operatively coupled to a first set of modular compute boards and a first set of resource boards. The second control board can be operatively coupled to a second set of modular compute boards and a second set of resource boards. The first control board can dynamically allocate and/or deallocate at least one resource board from collectively the first set of resource boards and the second set of resource boards. In some instances, allocation and/or deallocation of the first set of resources can be done directly by the first control board, whereas allocation and/or deallocation of the second set of resources can be done indirectly and via the second control board. For example, the first control board and the second control board can be operably coupled together (e.g., via a direct connection or via an indirect connection for example through a bus) and coordinate the allocation and/or deallocation of the first and second sets of modular compute boards and the first and second set of the resource boards.

In one example, the control board, the set of modular compute boards and the set of resource boards can collectively form a computer. The set of modular compute boards includes (a) a first modular compute board, (b) a second modular compute board and (c) a third modular compute board. The first modular compute board provides user interface functionality of the computer and not networking functionality of the computer and not storage functionality of the computer. The second modular compute board provides networking functionality of the computer and not user interface functionality of the computer and not storage functionality of computer. The third modular compute board provides storage functionality of the computer and not user interface functionality of the computer and not networking functionality of the computer.

In one example, the control board, the set of modular compute boards and the set of resource boards collectively form a computer. The control board can be configured to perform control functions for the computer (e.g., decode instructions or codes into control commands). Each modular compute board from the set of compute boards can be configured to perform a compute function(s) (e.g., storage, arithmetic processing, networking, and/or the like) and not the control functions of the control board. Each resource board from the set of resource boards can be configured to perform a resource function(s) (e.g., storage, processing, networking, sound interface, graphics interfaces, neural network processing, power generation, and/or the like) and not the control functions of the control board.

In some implementations, each modular compute board from the set of modular compute boards can be provisioned upon a boot up (e.g., upon connecting to a power source and/or upon connection to the control board) of that modular compute board. Each modular compute board from the set of modular compute boards can be configured to perform provisioning functions and no other control functions. In one example, the set of modular compute boards can include a set of field programmable gate arrays (FPGAs) that can be dynamically programmed to perform at least one function. Once the FPGAs are connected the control board are provided power to boot up, the control board can send each FPGA from the set of FPGAs a signal indicating a function for that FPGA.

In some implementations, each resource board from the set of resource boards can be provisioned upon a boot up (e.g., upon connecting to a power source and/or upon connection to the control board) of that resource board. Each resource board from the set of resource boards can be configured to perform a provisioning function(s) and no other control functions. In one example, the set of resource boards can be programmed to perform at least one function. Once the resource boards are connected the control board and are provided power to boot up, the control board can send each resource board from the set of resource boards a signal indicating a function for that resource board.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus, comprising:
a memory, and
a processor coupled to the memory and configured to be coupled to each modular compute board from a plurality of modular compute boards and each resource board from a plurality of resource boards by (1) a first connection associated with control information and not data, and (2) a second connection associated with data and not control information, each resource board from the plurality of resource boards configured to be dynamically allocated and deallocated,
the processor configured to send, to a modular compute board from the plurality of modular compute boards and via the first connection for that modular compute board, a signal indicating an allocation of that modular compute board during a time period, the allocation of that modular compute board based on at least one of a computation load or a physical resource requirement,
the processor configured to send, to a resource board from the plurality of resource boards and via the first connection for that resource board, a signal indicating an allocation of that resource board to the modular compute board during the time period, the allocation of that resource board based on at least one of the computation load or the physical resource requirement,
the modular compute board communicating with the resource board during the time period via the second connection for that modular compute board and the second connection for that resource board.

2. The apparatus of claim 1, wherein:
the time period is a first time period,
the processor is configured to determine a computation load and a physical resource requirement for during a second time period,
the processor is configured to send, to the modular compute board and via the first connection for the modular compute board, a signal indicating an allocation of that modular compute board during the second time period, the allocation for the modular compute board during the second time period based on at least one of the computation load or the physical resource requirement,
the processor configured to send, to the resource board, a signal indicating a deallocation of the resource board associated with the modular compute board such that the resource board deallocates the portion of its resources associated with the modular compute board based on at least one of the computation load or the physical resource requirement during the second time period,
the modular compute board not facilitating communication between the modular compute board and the resource board during the second time period via the second connection for the modular compute board and the second connection for the resource board.

3. The apparatus of claim 1, further comprising an internal PCI-express switch fabric coupled to the processor and configured to be coupled to each modular compute board from the plurality of modular compute boards by the second connection for that modular compute board and each resource board from the plurality of resource boards by the second connection for that resource board.

4. The apparatus of claim 1, wherein the processor is included on a first control board, the plurality of modular compute boards is a first plurality of modular compute boards, the plurality of resource boards is a first plurality of resource boards, the apparatus further comprising:
a plurality of control boards that includes the first control board and a second control board, each control board from the plurality of control boards operatively coupled to remaining control boards from the plurality of control boards, the second control board operatively coupled to a second plurality of modular compute boards and a second plurality of resource boards,
the first control board configured to dynamically allocate and deallocate at least one resource board from collectively the first plurality of resource boards and the second plurality of resource boards.

5. The apparatus of claim 1, wherein:
the processor, the plurality of modular compute boards and the plurality of resource boards collectively form a computer,
the processor, the plurality of modular compute boards, and the plurality of resource boards each alone not forming the computer.

6. The apparatus of claim 1, wherein:
the processor, the plurality of modular compute boards and the plurality of resource boards collectively form a computer,
the plurality of modular compute boards includes a first modular compute board, a second modular compute board and a third modular compute board,
the first modular compute board configured to provide user interface functionality of the computer and not networking functionality of the computer and not storage functionality of computer,
the second modular compute board configured to provide networking functionality of the computer and not user interface functionality of the computer and not storage functionality of computer,
the third modular compute board configured to provide storage functionality of the computer and not user interface functionality of the computer and not networking functionality of the computer.

7. The apparatus of claim 1, wherein:
the processor, the plurality of modular compute boards and the plurality of resource boards collectively form a computer,
the processor configured to perform control functions for the computer, each modular compute board from the plurality of modular compute boards configured to perform compute functions and not the control functions of the processor, each resource board from the plurality of resource boards configured to perform resource functions and not the control functions of the processor.

8. The apparatus of claim 1, wherein:
the processor is configured to provision each modular compute board from the plurality of modular compute boards upon boot up of that modular compute board,
each modular compute board from the plurality of modular compute boards configured to perform provisioning functions and no other control functions.

9. The apparatus of claim 1, wherein:
the processor is configured to provision each resource board from the plurality of resource boards upon boot up of that resource board,
each resource board from the plurality of resource boards configured to perform provisioning functions and no other control functions.

10. A processor-readable medium storing instructions that, when executed by a processor, cause the processor to:
send, to a modular compute board from a plurality of modular compute boards, a signal indicating an allocation of the modular compute board within a time period, the allocation based on at least one of a computation load or a physical resource requirement,
each modular compute board from the plurality of modular compute boards being operatively coupled (1) by a first connection associated with control information and not data, and (2) to a switch fabric by a second connection associated with data and not control information, the signal to the modular compute board sent via the first connection for that modular compute board;
send, to a resource board from a plurality of resource boards, a signal indicating an allocation of the resource board to the modular compute board within the time period, the allocation based on at least one of the computation load or the physical resource requirement,
each resource board from the plurality of resource boards is operatively coupled (1) by a first connection associated with control information and not data, and (2) to the switch fabric by a second connection associated with data and not control information, the signal to the resource board sent via the first connection for the resource board; and
facilitate, by the switch fabric, communication between the modular compute board and the resource board via the second connection for that modular compute board and the second connection for that resource board.

11. The processor-readable medium of claim 10, wherein the time period is a first time period, the instructions further comprising instructions that, when executed by the processor, cause the processor to:
send, to the modular compute board from the plurality of modular compute boards and via the first connection for that modular compute board, a signal indicating a deallocation of that modular compute board during a second time period, the deallocation of that modular compute board during the second time period based on at least one of a computation load or a physical resource requirement during the second time period;
send, to the resource board from the plurality of resource boards and via the first connection for the resource board, a signal indicating a deallocation of the resource board associated with the modular compute board such that the resource board deallocates the portion of its resources associated with the modular compute board during the second time period based on at least one of the computation load or the physical resource requirement during the second time period; and
not communicate between the modular compute board and the resource board during the second time period via the second connection for the modular compute board and the second connection for the resource board.

12. The processor-readable medium of claim 10, wherein the switch fabric includes an internal PCI-express switch fabric operatively coupled to each modular compute board from the plurality of modular compute boards by the second connection for that modular compute board and each resource board from the plurality of resource boards by the second connection for that resource board.

13. The processor-readable medium of claim 10, wherein the plurality of resource boards is a first plurality of resource boards, the instructions further comprising instructions that, when executed by the processor, cause the processor to:
dynamically allocate and deallocate at least one resource board from collectively the first plurality of resource boards and a second plurality of resource boards different from the first plurality of resource boards.

14. The processor-readable medium of claim 10, wherein:
the processor, the switch fabric, the plurality of modular compute boards and the plurality of resource boards collectively form a computer,
the processor, the switch fabric, the plurality of modular compute boards, and the plurality of resource boards each alone not forming the computer.

15. The processor-readable medium of claim 10, wherein:
the processor, the switch fabric, the plurality of modular compute boards and the plurality of resource boards collectively form a computer,
the plurality of modular compute boards includes a first modular compute board, a second modular compute board and a third modular compute board,
the instructions further comprising instructions that, when executed by the processor, cause the processor to:
facilitate user interface functionality of the computer at the first modular compute board and not networking functionality of the computer and not storage functionality of computer;
facilitate networking functionality of the computer at the second modular compute board and not user interface functionality of the computer and not storage functionality of computer; and
facilitate storage functionality of the computer at the third modular compute board and not user interface functionality of the computer and not networking functionality of the computer.

16. The processor-readable medium of claim 10, wherein the processor, the switch fabric, the plurality of modular compute boards and the plurality of resource boards collectively form a computer,
the instructions further comprising instructions that, when executed by the processor, cause the processor to:
perform control functions for the computer;
facilitate compute functions at each modular compute board from the plurality of modular compute boards; and
facilitate resource functions at each resource board from the plurality of resource boards.

17. The processor-readable medium of claim 10, wherein the instructions further comprise instructions that, when executed by the processor, cause the processor to:
provision each modular compute board from the plurality of modular compute boards upon boot up of that modular compute board,
each modular compute board from the plurality of modular compute boards configured to perform provisioning functions and no other control functions.

18. The processor-readable medium of claim 10, wherein the instructions further comprise instructions that, when execute by the processor, cause the processor to:
provision each resource board from the plurality of resource boards upon boot up of that resource board,
each resource board from the plurality of resource boards configured to perform provisioning functions and no other control functions.

19. The processor-readable medium of claim 10, wherein the processor and the switch fabric are disposed on a common printed circuit board.

20. An apparatus, comprising:
a first controller configured to be operatively coupled to each modular compute board from a plurality of modular compute boards by a connection associated with control information and not data;
a second controller configured to be operatively coupled to each resource board from a plurality of resource boards by a connection associated with control information and not data; and
the first controller configured to send, to a modular compute board from the plurality of modular compute boards and via the connection for that modular compute board, a signal indicating an allocation of that modular compute board during a time period, the allocation of that modular compute board based on at least one of a computation load or a physical resource requirement,
the second controller configured to send, to a resource board from the plurality of resource boards, a signal indicating an allocation of that resource board to the modular compute board during the time period, the allocation of that resource board based on at least one of the computation load or the physical resource requirement,
the modular compute board configured to communicate with the resource board during the time period via a switch fabric.

21. The apparatus of claim 20, wherein:
the first controller is configured to provision each modular compute board from the plurality of modular compute boards upon boot up of that modular compute board, each modular compute board from the plurality of modular compute boards configured to perform a provisioning function and no other control functions,
the second controller is configured to provision each resource board from the plurality of resource boards upon boot up of that resource board, each resource board from the plurality of resource boards configured to perform a provisioning function and no other control functions.

22. The apparatus of claim 20, wherein the first controller, the second controller and the switch fabric are disposed on a common printed circuit board.

* * * * *